(12) United States Patent
Carrillo et al.

(10) Patent No.: US 8,447,957 B1
(45) Date of Patent: May 21, 2013

(54) COPROCESSOR INTERFACE ARCHITECTURE AND METHODS OF OPERATING THE SAME

(75) Inventors: Jorge Ernesto Carrillo, San Jose, CA (US); Navaneethan Sundaramoorthy, San Jose, CA (US); Sivakumar Velusamy, Los Gatos, CA (US); Ralph D. Wittig, Menlo Park, CA (US); Vasanth Asokan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1614 days.

(21) Appl. No.: 11/598,990

(22) Filed: Nov. 14, 2006

(51) Int. Cl.
*G06F 9/345* (2006.01)

(52) U.S. Cl.
USPC .......................................... 712/225; 712/14

(58) Field of Classification Search
USPC .................. 712/10, 11, 14, 18, 34, 225
See application file for complete search history.

(56) References Cited

U.S. PATENT DOCUMENTS

| | | | | |
|---|---|---|---|---|
| 4,819,211 | A * | 4/1989 | Takagi | 711/207 |
| 5,109,333 | A * | 4/1992 | Kubota et al. | 712/34 |
| 5,724,548 | A * | 3/1998 | Takahashi et al. | 711/138 |
| 5,742,295 | A * | 4/1998 | Lindholm | 345/427 |
| 5,978,897 | A * | 11/1999 | Nakagawa | 712/200 |
| 6,163,835 | A * | 12/2000 | Todd et al. | 712/34 |
| 6,976,126 | B2 * | 12/2005 | Clegg et al. | 711/128 |
| 7,210,022 | B2 * | 4/2007 | Jungck et al. | 712/34 |
| 7,318,144 | B2 * | 1/2008 | Najam et al. | 712/34 |
| 2003/0009651 | A1 * | 1/2003 | Najam et al. | 712/34 |
| 2005/0268072 | A1 * | 12/2005 | Najam et al. | 712/34 |

OTHER PUBLICATIONS

Xilinx, Inc.; U.S. Appl. No. 10/912,844, filed Aug. 6, 2004 by Ansari et al.
Xilinx, Inc.; U.S. Appl. No. 10/912,865, filed Aug. 6, 2004 by Purcell et al.
Xilinx, Inc.; U.S. Appl. No. 10/912,897, filed Aug. 6, 2004 by Ansari et al.
Xilinx, Inc.; U.S. Appl. No. 10/913,231, filed Aug. 6, 2004 by Ansari et al.
Xilinx, Inc.; U.S. Appl. No. 10/913,282, filed Aug. 6, 2004 by Ansari et al.
Xilinx, Inc.; U.S. Appl. No. 10/913,991, filed Aug. 6, 2004 by Purcell et al.

* cited by examiner

*Primary Examiner* — Aimee Li
(74) *Attorney, Agent, or Firm* — Lois D. Cartier; LeRoy D. Maunu (57) ABSTRACT

A novel coprocessor interface providing memory access without traversing the main processor, and methods of operating the same. A system includes a bus, a processor circuit, a memory circuit, a multi-channel memory controller, and at least one coprocessor. The processor circuit is coupled to the bus, the multi-channel memory controller is coupled between the bus and the memory circuit, and the coprocessors are coupled to both the processor circuit and the multi-channel memory controller. This circuit arrangement provides dedicated high speed channels for data access between the coprocessors and the memory circuit, without traversing the processor circuit or the bus. Thus, non-standard (e.g., non-sequential) data transfer protocols can be supported. In some embodiments, the system is implemented in a programmable logic device (PLD). The processor circuit can be, for example, a microprocessor included as hard-coded logic in the PLD, or can be implemented using programmable logic elements of the PLD.

18 Claims, 7 Drawing Sheets

COPROCESSOR INTERFACE ARCHITECTURE AND METHODS OF OPERATING THE SAME

FIELD OF THE INVENTION

The invention relates generally to a system including a coprocessor, and more particularly to methods and structures for interfacing between the coprocessor and other elements of the system.

BACKGROUND OF THE INVENTION

Coprocessors are conventionally used to accelerate streaming software applications. System designers can profile applications to find "bottlenecks", i.e., areas of the system that are causing performance degradation of the system as a whole. Some or all of these bottlenecks may be identified as being suitable for coprocessor acceleration. A hardware equivalent of a suitable piece of code (e.g., "C" language code) can be created, for example, in the fabric of a programmable logic device (PLD). For example, an HDL (high-level description language) description of a function can be created, and can be translated into a PLD implementation of the function. This PLD implementation is then used to replace the software implementation, resulting in the accelerated function of the system as a whole.

Figure 1:
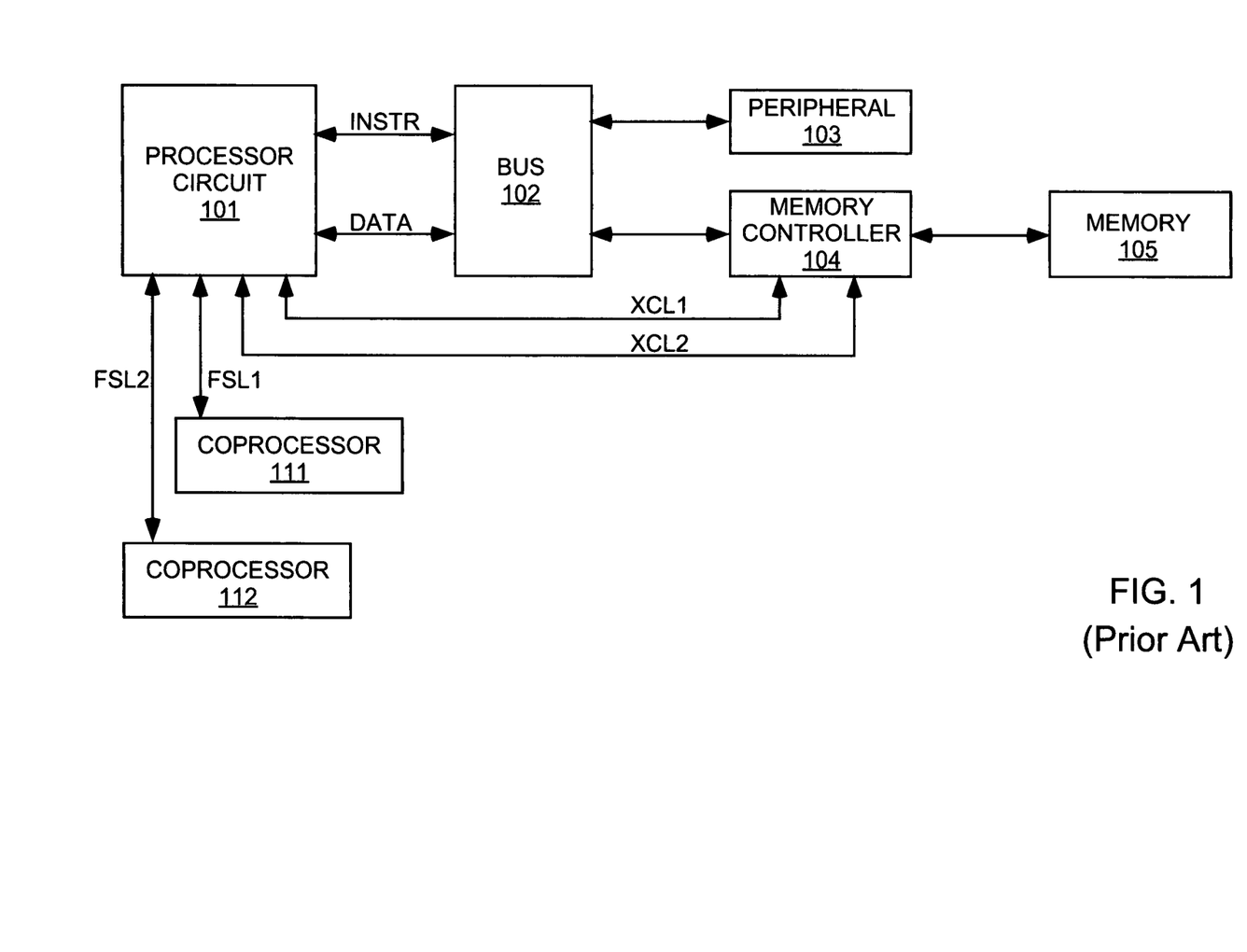
FIG. 1 is a block diagram of a first known system including a main processor and two coprocessors.

Some coprocessors rely on the computation data being sent from the main processor, as in the system shown in FIG. 1. The system of FIG. 1 includes a processor circuit 101, a bus 102 coupled to receive instructions (INSTR) and data (DATA) from processor circuit 101, an optional peripheral function 103 coupled to bus 102, a memory circuit 105, and a memory controller 104 providing access between bus 102 and memory circuit 105.

The system of FIG. 1 also includes two coprocessors 111, 112. Each coprocessor is coupled to the processor circuit 101 via an FSL channel FSL1, FSL2. An FSL channel is a serial FIFO interface capable of transferring control and data information. Values sent over an FSL interface are read at the destination in the same order in which they are written. An FSL interface includes signals to control the data flow, e.g., signals that identify when data is available or when the FIFO is full. An FSL interface also includes signals regarding the nature of the information being transferred, e.g., whether a transmission is a control or data value.

Processor circuit 101 is coupled to memory controller 104 via two XCL channels (XCL1, XCL2). An XCL channel is a serial FIFO interface (e.g., an FSL channel) that is optimized for transferring sequential data, e.g., cache data from a memory. XCL is a protocol built on top of an FSL channel. When reading data under the XCL protocol, an address "A" is sent over the FSL channel from the master side. The length (the number of data values) is a fixed cache size "L". The slave responds by transferring "L" values to the master. The transferred data corresponds to data stored in addresses in the range of "A" to "A+L−1" (A plus L minus one) in the accessed memory. When writing data under the XCL protocol, again an address "A" is sent over the FSL channel from the master side, followed by "L" data values, which the slave side stores in addresses "A" to "A+L−1" of the memory circuit. Therefore, the data accessed in a single transaction includes either a single word, or a "burst" of data located in a predetermined number of sequential addresses in the memory circuit.

The system of FIG. 1 has a significant drawback, in that data used by the coprocessors 111, 112 must traverse the datapath of processor circuit 101. Therefore, this implementation is often undesirably slow.

Figure 2:
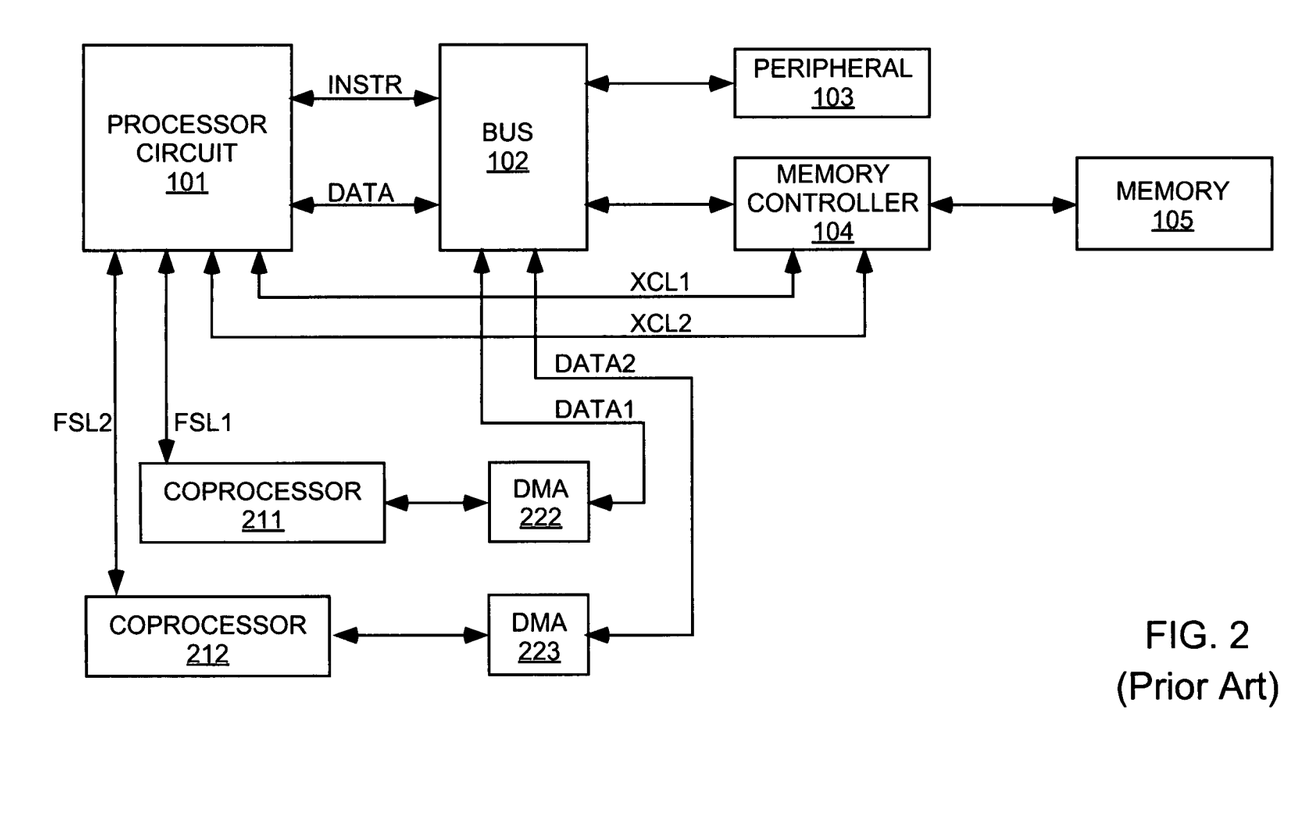
FIG. 2 is a block diagram of a second known system including a main processor and two coprocessors.

FIG. 2 shows an alternative system using coprocessors. In this system, coprocessors 211, 212 interface with processor circuit 101 to receive instructions. However, data is retrieved via DMA (direct memory access) controllers 222, 223, data channels DATA1, DATA2, and the main bus 102. Therefore, coprocessors 211, 212 can access data from memory circuit 105 without traversing processor circuit 101. This arrangement can lead to improved performance compared to the system of FIG. 1. However, the system of FIG. 2 also has its drawbacks. Notably, the two processors 211, 212 are now utilizing the same bus 102 as that used by processor circuit 101. This can result in slow performance, if processor circuit 101 needs to use the bus at the same time that the bus is being used by one of the coprocessors. Also, a DMA controller is included in the system for each coprocessor, and an internal memory buffer is included in each coprocessor to store the values read by the DMA controller. These additional components increase the size of the system as a whole. An additional limitation of the system of FIG. 2 is that the memory access patterns available to the coprocessors are limited by the protocols supported by bus 102.

Therefore, it is desirable to provide systems that include both a main processor and one or more coprocessors, where the coprocessors neither access data via the main processor nor compete with the main processor for bus resources.

SUMMARY OF THE INVENTION

The invention provides a system (e.g., an integrated circuit such as a programmable logic device) that includes a novel coprocessor interface providing memory access without traversing the main processor. A system includes a bus, a processor circuit, a memory circuit, a multi-channel memory controller, and at least one coprocessor. The processor circuit is coupled to the bus, the multi-channel memory controller is coupled between the bus and the memory circuit, and the coprocessors are coupled to both the processor circuit and the multi-channel memory controller. In some embodiments, the multi-channel memory controller includes an address generator circuit coupled to provide address information to the memory circuit. In some embodiments, the system further includes a separate address generator circuit coupled between the coprocessors and the multi-channel memory controller. In some embodiments, the interface between the coprocessors and the processor circuit are serial interfaces, as are the interfaces between the coprocessors and the multi-channel memory controller.

This circuit arrangement provides, for example, dedicated high speed channels for data access between the coprocessors and the memory circuit, without traversing either the datapath of the processor circuit, or the bus. Therefore, memory accesses between the coprocessors and the memory circuit can be performed more rapidly than in known circuit arrangements, and can be more elaborate than the standard bus transactions, if desired. Further, the coprocessors are not in competition with the processor circuit for bus resources within the system.

In some embodiments, the system is implemented in a programmable logic device (PLD). The processor circuit (i.e., the main processor) can be, for example, a microprocessor included as hard-coded logic in the PLD, or can be implemented using programmable logic elements of the PLD.

According to another aspect of the invention, a method of operating a coprocessing system provides the capability of having a first processor (e.g., a main processor or a coprocessor) initiate a read from the memory circuit, where in response the data is provided to another processor via an independent communications link. One embodiment includes, for example, sending a command and an access pattern from a first processor to the memory controller via a first communications link, decoding the access pattern in the memory controller to produce a series of addresses corresponding to locations in the memory circuit, sending a series of read requests from the memory controller to the memory circuit and fetching in response a stream of data from the memory circuit at the locations corresponding to the series of addresses, and providing the stream of data from the memory controller to a second processor via a second communications link independent from the first communications link, the stream of data bypassing the first processor.

Yet another aspect of the invention provides a method of operating a coprocessing system in which a first processor (e.g., a main processor or a coprocessor) initiates a write to the memory circuit, where in response the data is obtained from another processor via an independent communications link and written to the memory circuit. One embodiment includes, for example, sending a command and an access pattern from a first processor to the memory controller via a first communications link, sending a stream of data from a second processor to the memory controller via a second communications link independent from the first communications link, decoding the access pattern in the memory controller to produce a series of addresses corresponding to locations in the memory circuit, and sending a series of data write requests from the memory controller to the memory circuit and writing the stream of data to the locations in the memory circuit corresponding to the series of addresses, the stream of data bypassing the first processor.

BRIEF DESCRIPTION OF THE DRAWINGS

The present invention is illustrated by way of example, and not by way of limitation, in the following figures.

DETAILED DESCRIPTION OF THE DRAWINGS

The present invention is applicable to a variety of systems. The present invention has been found to be particularly applicable and beneficial for integrated circuits (ICs) such as programmable logic devices (PLDs). An appreciation of the present invention is presented by way of specific examples utilizing PLDs such as field programmable gate arrays (FPGAs). However, the present invention is not limited by these examples, and can be applied to other systems, including non-programmable systems, or systems that are only partially programmable.

Figure 3:
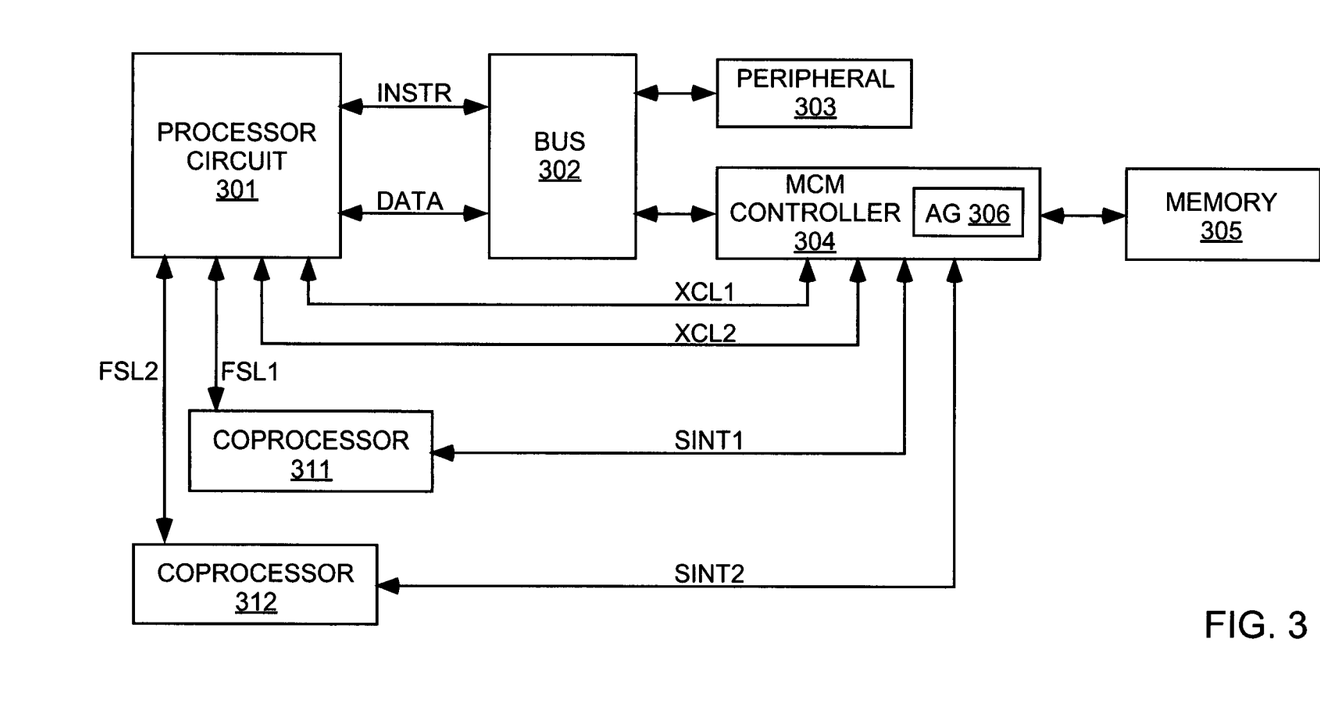
FIG. 3 is a block diagram of a first novel system including a main processor and two coprocessors and utilizing a novel coprocessor interface.

FIG. 3 illustrates a first system utilizing a novel coprocessor interface. The system includes a processor circuit 301, a bus 302 coupled to receive instructions (INSTR) and data (DATA) from processor circuit 301, an optional peripheral function 303 coupled to bus 302, a memory circuit 305, and a multi-channel memory (MCM) controller 304 providing access between bus 302 and memory circuit 305. Processor circuit 301 is coupled to multi-channel memory controller 304 via two XCL channels (XCL1, XCL2). Multi-channel memory controller 304 includes an address generator circuit 306.

Processor circuit 301 can be any of several types of processing circuits, for example, a microprocessor, a RISC processor, or a state machine. Processor circuit 301 can be the same as processor circuit 101, if desired (see FIG. 1). Bus 302 can be any of several known types of busses. For example, when the system of FIG. 3 is implemented in a single integrated circuit (IC), e.g., a programmable logic device (PLD), bus 302 can be an internal bus of the IC, such as an on-chip peripheral bus. Bus 302 can be the same as bus 102, if desired (see FIG. 1). Memory circuit 305 can be an on-chip or off-chip memory. For example, when the system of FIG. 3 is implemented in a single PLD, memory circuit 305 can be a dedicated RAM block, also known as a block RAM. Optional peripheral function 303 and multi-channel memory controller 304 can be implemented, for example, using configurable logic blocks in the PLD. In some embodiments, processor circuit is implemented in a separate IC from the other elements of the system, e.g., as a stand-alone microprocessor chip.

The system of FIG. 3 also includes two coprocessors 311, 312. (The illustration of a system including two coprocessors is purely exemplary. Systems according to other embodiments can include only one coprocessor, or more than two coprocessors.) Each coprocessor is coupled to the processor circuit 101 via a serial interface, e.g., an FSL channel FSL1, FSL2. However, each processor circuit is also coupled to multi-channel memory controller 304 via another serial interface (e.g., an XCL channel or other serial channel) SINT1, SINT2. Thus, each coprocessor can retrieve data from, and/or write data to, memory circuit 305 without traversing either processor circuit 301 or bus 302, thereby avoiding the performance degradation that can result from interference with the functions of the main processor.

In some embodiments, serial interfaces SINT1 and SINT2 comprises separate serial channels for data and control functions. In other embodiments, the serial interfaces use a combined channel that transfers both data and control signals.

Note that the system of FIG. 3 includes a multi-channel memory controller rather than a single-channel memory controller such as the one used in the systems of FIGS. 1 and 2. The additional channels are provided in order to allow the coprocessor(s) direct access to the memory circuit.

An exemplary coprocessor operation is now described. The operation is initiated by the main processor (e.g., processor circuit 301 in FIG. 3). Processor circuit 301 sends the address and length of the data to be processed through the FSL interface (e.g., FSL1) to the coprocessor (e.g., coprocessor 311). Coprocessor 311 forwards the data to multi-channel memory controller 304 through the associated serial interface (SINT1). Multi-channel memory controller 304 retrieves the data from memory circuit 305 and transfers the data back to coprocessor 311 through serial interface SINT1. Coprocessor 311 performs the indicated operation on the data and sends the result back to processor circuit 301 through the FSL interface FSL1. Additionally or alternatively, coprocessor 311 can send the result back to memory circuit 305 via memory controller 304, and provide a status signal back to the main processor through the FSL interface FSL1. Note that in these embodiments the result, for example, can be a data stream that does not need to pass through the main processor datapath.

In some embodiments, the pipelined nature of the serial interface allows coprocessor 311 to begin an operation as soon as the first piece of data arrives, without waiting for all of the data to arrive. The coprocessor can take advantage of this pipelining if the nature of the operation allows. The sequential nature of C program descriptions, for example, typically allow many or most of the applications likely to be performed by a coprocessor to fall into this category. Therefore, data transfer and computation are preferably pipelined as much as possible.

In the pictured embodiment, multi-channel memory controller 304 also includes an address generator circuit 306 that can generate, for example, a pattern of memory addresses based on information (e.g., an access pattern) provided by one or both of the coprocessors. (Note that in some embodiments, multi-channel memory controller 304 is designed so that memory access transactions from processor circuit 301 bypass address generator circuit 306, while memory access transactions initiated by either of the coprocessors are routed through the address generator circuit.) Because the paths between the coprocessors 311, 312 and the memory circuit 305 do not traverse bus 302, the transactions between the coprocessors and the memory circuit are not limited by the protocols supported by bus 302. For example, bus 302 may support only standard memory requests such as single read and write transactions and/or sequential read and write bursts. Nevertheless, bypassing bus 302 as shown in FIG. 3 enables the use of a memory controller that can process non-standard memory requests.

For example, in some embodiments serial interfaces SINT1 and SINT2 are similar to the XCL interfaces previously described. However, interfaces SINT1 and SINT2 are modified from the standard XCL interface of XCL1 and XCL2 to be more suited to coprocessor functions. In one embodiment, the reading protocol is modified such that two values are sent over the serial interface from the master side. Instead of sending just the address information, with the length being fixed (as in a standard XCL interface), the address and the length are both provided to the slave side of the interface. With an address "A" and a length "L" being provided, the slave side responds and transfers "L" memory values. This data corresponds to data stored in addresses ranging from "A" to "A+L−1" (A plus L minus one) from memory circuit 305. The writing protocol is also modified. Again, two values are sent over the serial interface from the master side, the address "A" and the length "L". The master then sends "L" values, which the slave stores in addresses "A" to "A+L−1" of memory circuit 305.

In other embodiments, address generator 306 supports memory addressing that accesses non-sequential data. For example, one embodiment supports a memory addressing protocol that permits addressing functions wherein, for example, each subsequent address is two times the previous address, or each "nth" address is accessed, where "n" is an integer, or the memory accesses follow some other specified function. The sequence of addresses can follow any supported pattern, as long as the pattern can be specified by the system designer, with any necessary variables being supplied by the coprocessor and communicated to the memory controller via the serial interface. When the system is implemented in a PLD, for example, a function defining a desired data transfer protocol can simply be included in the HDL (or other) description of the desired functionality for the coprocessor and the address generator.

A first example of how non-sequential data can be specified is now provided. In this example, the main processor initiates a read request, and the data read from the memory circuit is provided directly from the memory controller to the coprocessor. For example, an application may include a specification for a 64-tap FIR filter, which is targeted for implementation using a coprocessor in the system. C code for the 64-tap FIR filter may written as follows, for example:

```
void FIR64( ) {
    For (J = 0; J < N; J++) {
        Sum = 0;
        For (I = 0; I < 64; I++) {
            Sum += X[I+J] * H[I];
        }
        Y[J] = Sum;    // followed by additional code
    }
}
```

To implement this code, the main processor will send a read request to the memory circuit, and supply the values of I and J to the memory controller. The memory controller will calculate the address locations from which to fetch the stored data, and fetch the values of X and H for each value of I between 0 and 63, and for each value of J between 0 and N−1. The memory controller will then send the data read from the memory to the coprocessor, which will calculate the results and store them back in the memory.

In this example, the interface code (the command information) between the processor and the memory controller can be written, for example, as:

```
// Interface code between the main processor and memory controller
void FIR64( ) {
    Processor_Put(XCL1, 0);              // start count for J
    Processor_Put(XCL1, N);              // end count for J
    Processor_Put(XCL1, 1);              // increment value for J
    // set base address for J. Indicate External Memory Read
    Processor_PutC(XCL1, Base_Addr_J);   // initiates J counter
    Processor_Put(XCL1, 0);              // start count for I
    Processor_Put(XCL1, 64);             // end count for I
    Processor_Put(XCL1, 1);              // increment value for I
    // set base address for I. Indicate External Memory Read
    Processor_PutC(XCL1, Base_Addr_I);   // initiates I counter
}
```

In this embodiment, the address generator first calculates the values of I and J, then fetches the values of X and H based on the calculated values for I and J, and returns the values of X and H to the coprocessor. The returned data is sent sequentially, in order, from the memory controller to the coprocessor over an interface that can be implemented, for example, as a simple FIFO interface.

Continuing with the C code FIR-filter example above, the coprocessor then calculates the values of SUM[J] based on the retrieved memory values, and writes the values of SUM[J] back to the memory circuit. The addresses for storing the calculated values SUM[J] are calculated as another function of J. This calculation can be performed in another address generator, which can also be included in the memory controller, if desired. In another embodiment, the second calculation is performed in the same address generator as was used in the previously-described read process, but using a different access pattern.

Figure 4:
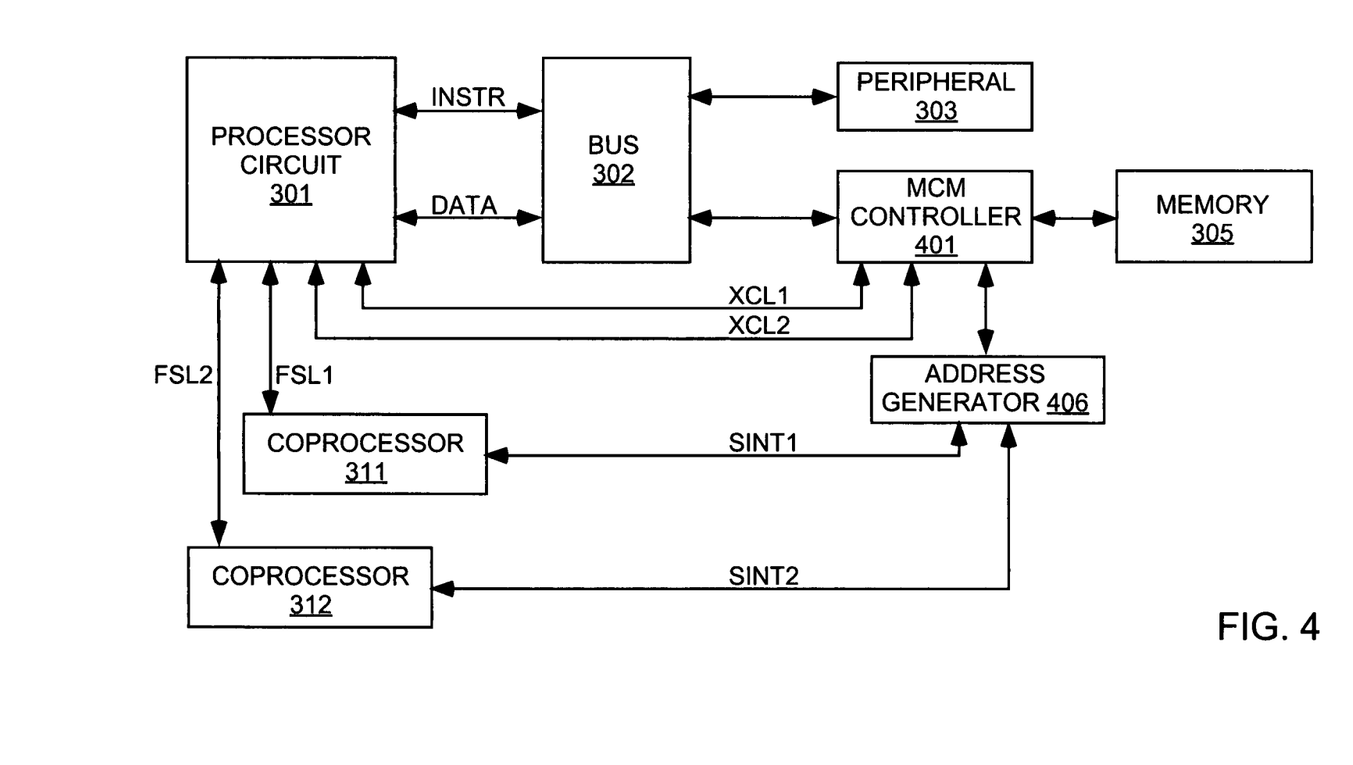
FIG. 4 is a block diagram of a second novel system including a main processor and two coprocessors and utilizing a novel coprocessor interface.

A second example of how non-sequential data can be specified is now provided. In this example, the system includes two coprocessors, e.g., as shown in FIGS. 3 and 4. The first coprocessor initiates a read request, and the data read from the memory circuit is provided directly from the memory controller to the second coprocessor. For example, this type of transaction may be useful in applications where encoders/decoders are implemented in stages (e.g., MPEG, JPEG, and so forth), and each stage is implemented using a different coprocessor.

In the following exemplary application, two consecutive matrix computations are performed, sequentially. First, C code for this application is provided. Then it is demonstrated how the C code can be rewritten to take advantage of the availability of two coprocessors. Finally, the action of each coprocessor with respect to the data is shown.

As in the FIR filter example above, a read request is sent to the memory circuit, and the values of I and J are supplied to the memory controller. The memory controller calculates the address locations from which to fetch the stored data, and fetches the values of X and H for each value of I between 0 and 63, and for each value of J between 0 and N−1. The memory controller then sends the data read from the memory to initiating coprocessor, which calculates the results and stores them back in the memory.

The second matrix computation is similar to the first computation, but the values of Y stored in the first computation are read back from memory and are multiplied by the values of X used in the previous computation. The result is again stored back into Y in the memory circuit.

```
void FunctionX( ) {
    // Matrix operation #1
    For (J = 0; J < N; J++) {
        Sum = 0;
        For (I = 0; I < 64; I++) {
            Sum += X[I+J] * H[I];
        }
        Y[J] = Sum;
    }
    // Matrix operation #2
    For (L = 0; L < N; L++) {
        Sum = 0;
        For (K = 0; K < 64; K++) {
            Sum += X[K] * Y[L];
        }
        Y[K] = Sum;
    }
}
```

This application can be rewritten to utilize two coprocessors, one for each matrix computation. In the following example, a main processor is coupled to interface 1 of the memory controller. Two coprocessors are coupled to interfaces 2 and 3 of the memory controller.

```
void FunctionX( ) {
    Processor_Put(XCL1, 0);              // start count for J
    Processor_Put(XCL1, N);              // end count for J
    Processor_Put(XCL1, 1);              // increment value for J
    Processor_PutC(XCL1, 1);             // indicate external memory read (1 = Read, 0 = Write)
    Processor_PutC(XCL1, 2);             // indicate data goes to interface #2
    Processor_PutC(XCL1, Base_Addr_J);   // initiates J counter
    Processor_Put(XCL1, 0);              // start count for I
    Processor_Put(XCL1, 64);             // end count for I
    Processor_Put(XCL1, 1);              // increment value for I
    Processor_PutC(XCL1, 1);             // indicate external memory read (1 = Read, 0 = Write)
    Processor_PutC(XCL1, 2);             // indicate data goes to interface #2
    Processor_PutC(XCL1, Base_Addr_I);   // initiates I counter
    Processor_Put(XCL1, 0);              // start count for J
    Processor_Put(XCL1, 64);             // end count for J
    Processor_Put(XCL1, 1);              // increment value for J
    Processor_PutC(XCL1, 0);             // indicate external memory write (1 = Read, 0 = Write)
    Processor_PutC(XCL1, 2);             // indicate data comes from interface #2
    Processor_PutC(XCL1, Base_Addr_J);   // initiates J counter
    Processor_Put(XCL1, 0);              // start count for L
    Processor_Put(XCL1, N);              // end count for L
    Processor_Put(XCL1, 1);              // increment value for L
    Processor_PutC(XCL1, 1);             // indicate external memory read (1 = Read, 0 = Write)
    Processor_PutC(XCL1, 3);             // indicate data goes to interface #3
    Processor_PutC(XCL1, Base_Addr_L);   // initiates L counter
    Processor_Put(XCL1, 0);              // start count for K
    Processor_Put(XCL1, 64);             // end count for K
    Processor_Put(XCL1, 1);              // increment value for K
    Processor_PutC(XCL1, 1);             // indicate external memory read (1 = Read, 0 = Write)
    Processor_PutC(XCL1, 3);             // indicate data goes to interface #3
    Processor_PutC(XCL1, Base_Addr_K);   // initiates K counter
    Processor_Put(XCL1, 0);              // start count for K
    Processor_Put(XCL1, 64);             // end count for K
    Processor_Put(XCL1, 1);              // increment value for K
    Processor_PutC(XCL1, 0);             // indicate external memory write (1 = Read, 0 = Write)
    Processor_PutC(XCL1, 3);             // indicate data comes from interface #3
    Processor_PutC(XCL1, Base_Addr_K);   // initiates K counter
}
```

The functions performed by the two coprocessors can be described by the following pseudo-code. In some embodiments, including those targeted to PLD applications, the code for the coprocessors may be described in HDL code, for example. It will be clear to those of skill in the art how this HDL code can be written, based on the pseudo-code below.

```
Coprocessor1_Function( ) {
    Coprocessor_Get(XCL2, data);      // Get data from XCL2
    Calculate_Result1 (data);          // Calculate result
    Coprocessor_Put(XCL2, data);       // Put data back to XCL2
    Coprocessor_PutC(XCL2, 3);         // Indicate send data to
                                       coprocessor #2 on interface #3
}
Coprocessor2_Function( ) {
    Coprocessor_Get(XCL3, data);      // Get data from XCL3
    Calculate_Result2(data);           // Calculate result
    Coprocessor_Put(XCL3, data);       // Put data back to XCL3
    Coprocessor_PutC(XCL3, 1);         // Indicate to main processor on
                                       interface #1
                                       // that the computation is done
}
```

FIG. 4 illustrates a variation of the system of FIG. 3 in which the address generator circuit 406 is implemented as a separate logic block from the multi-channel memory controller 404. Address generator circuit 406 is coupled between the coprocessors 311, 312 and multi-channel memory controller 404. It will be clear to those of skill in the art that this and other modifications fall within the scope of the present invention.

Note that in the systems of FIGS. 3 and 4, there is no need to provide a DMA (direct memory access) controller for each of the coprocessors. There is also no need to include an internal memory buffer in each coprocessor to store the values read by the DMA controller. The memory controller on the other end of the XCL interface is responsible for accessing the memory circuit and the values are utilized for computation as soon as they arrive. Therefore, in some embodiments, only temporary result storage is needed in the coprocessor, resulting in smaller coprocessor implementations compared to those included in the systems of FIGS. 1 and 2.

Figure 5:
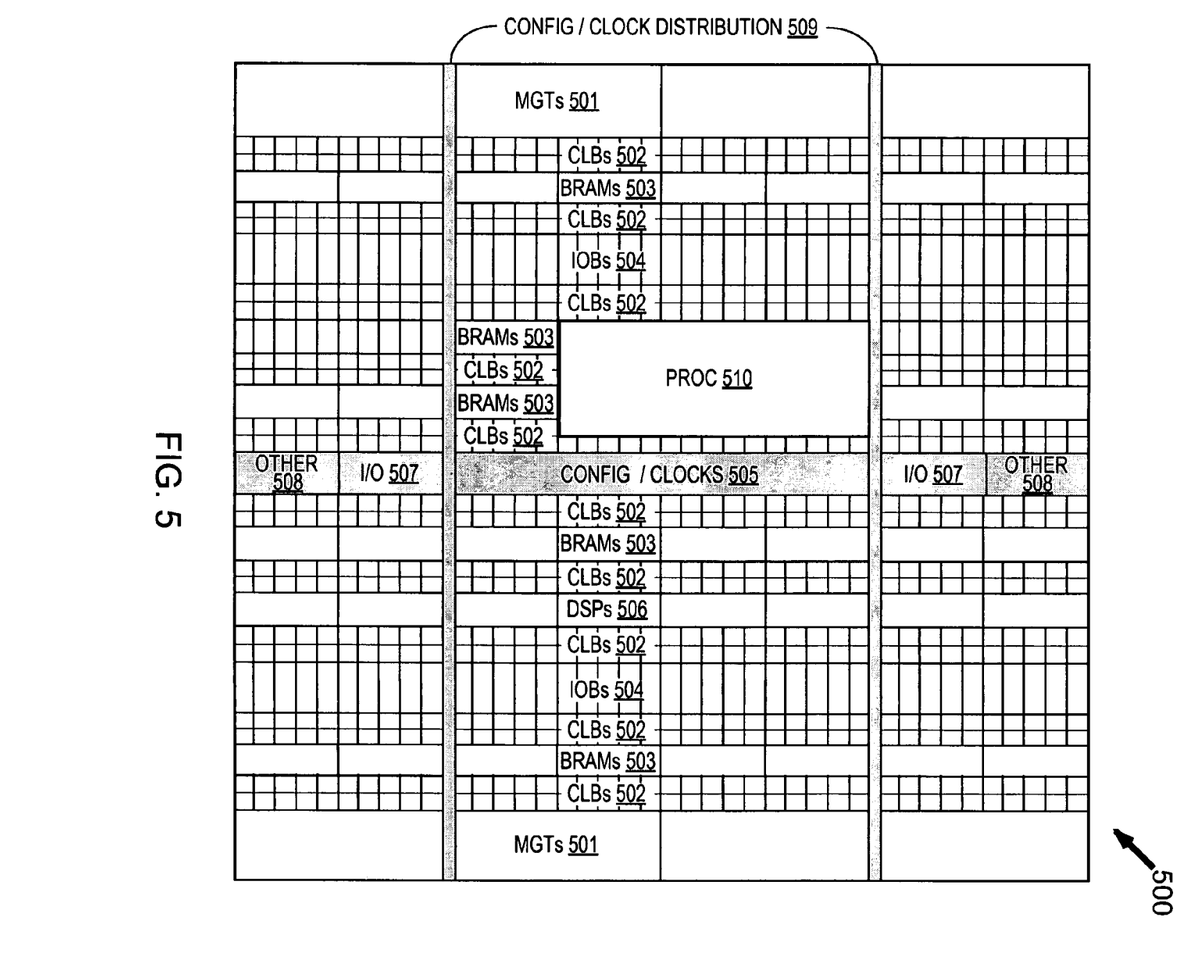
FIG. 5 illustrates an exemplary PLD in which the systems of FIGS. 3 and 4 can optionally be implemented.

FIG. 5 illustrates an exemplary PLD in which the systems of FIGS. 3 and 4 can optionally be implemented. Advanced field programmable gate arrays (FPGAs), for example, can include several different types of programmable logic blocks in the array, and these logic blocks can advantageously be used to implement the systems of the invention. For example, FIG. 5 illustrates an FPGA architecture 500 that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., configuration ports and clock ports), and other programmable logic 508 such as digital clock managers, analog-to-digital converters, system monitoring logic, and so forth. Some FPGAs also include dedicated processor blocks (PROC 510).

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the hard-coded processor block PROC 510 shown in FIG. 5 spans several columns of CLBs and BRAMs.

Processor block 510 can be used to implement processor circuit 301 of FIGS. 3 and 4. Alternatively or additionally, processor circuit 301 can be implemented using configurable logic blocks (CLBs 502) and random access memory blocks (BRAMs 503). For example, processor circuit 301 can be implemented as the MicroBlaze™ processor available from Xilinx, Inc., for implementation in the Virtex® series of FPGAs. Memory circuit 305 can be implemented, for example, using random access memory blocks (BRAMs 503). Bus 302 can be implemented, for example, using the on-chip peripheral bus provided in Virtex FPGAs (not shown in FIG. 5). Multi-channel memory controller 304/404 and address generator circuit 306/406 can be implemented, for example, using configurable logic blocks (CLBs 502). Coprocessors 311, 312 can be implemented using additional instantiations of the MicroBlaze processor, if desired. Other optional peripherals 303 can be implemented using any desired features available in the FPGA.

Figure 6:
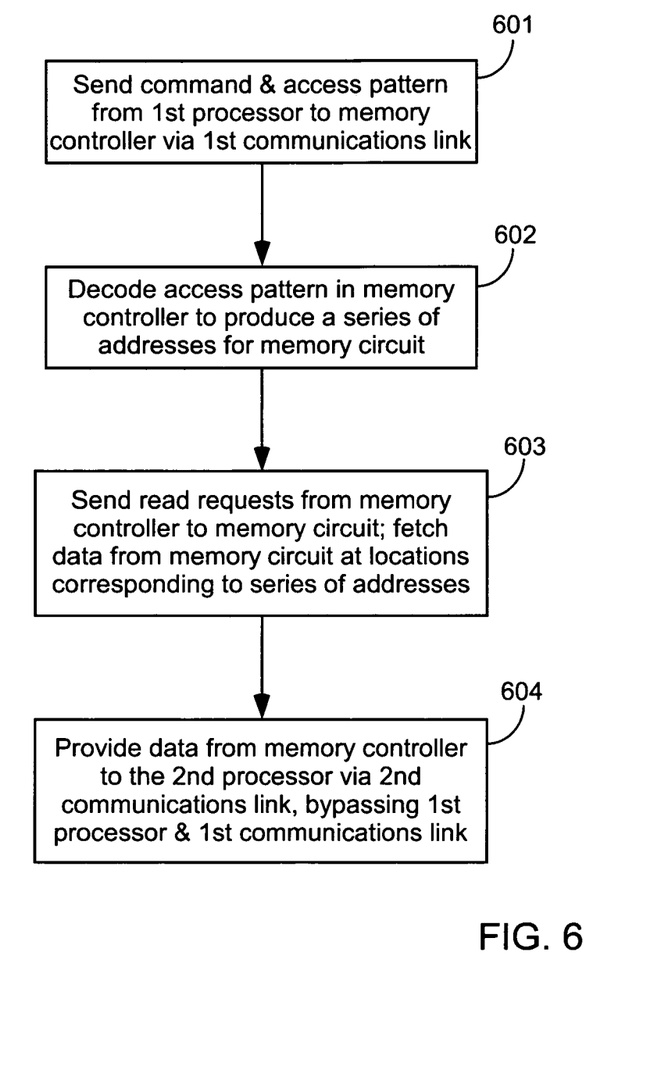
FIG. 6 illustrates the steps of a first method of utilizing a coprocessing system such as those shown in FIGS. 3 and 4.

The exemplary systems of FIGS. 3 and 4 can be used to perform several novel functions. For example, FIG. 6 illustrates the steps of a first such method. The method of FIG. 6 provides the capability of having a first processor (e.g., a main processor or a coprocessor) initiating a read from the memory circuit via a first communications link, where in response the data is provided to another processor (e.g., the coprocessor, the main processor, or a second coprocessor) via a second communications link independent from the first communications link. The data bypasses both the initiating processor and the first communications link, which can improve both the performance of the initiating processor, and the speed of the data transfer.

In step 601, a first processor (e.g., either the processing circuit or one of the coprocessors in FIGS. 3 and 4) sends a command and an access pattern to the memory controller via a first communications link. In step 602, the memory controller decodes the access pattern in the memory controller to produce a series of addresses corresponding to locations in the memory circuit. In step 603, the memory controller sends a series of read requests to the memory circuit. In response, data is fetched from the memory circuit at the locations corresponding to the series of addresses. In step 604, the data is provided by the memory controller to the second processor, bypassing both the first processor, i.e., the processor that initiated the read command, and the first communications link.

Figure 7:
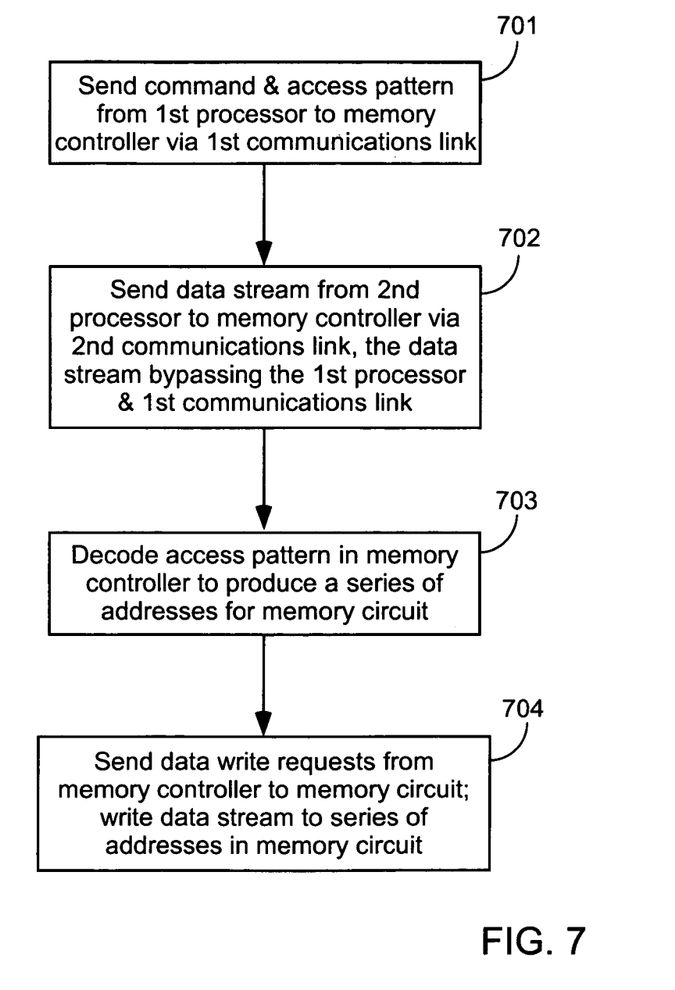
FIG. 7 illustrates the steps of a second method of utilizing a coprocessing system such as those shown in FIGS. 3 and 4.

FIG. 7 illustrates the steps of a second method of utilizing a coprocessing system such as those shown in FIGS. 3 and 4. in the exemplary method of FIG. 7, a first processor (e.g., a main processor or a coprocessor) initiates a write to the memory circuit via a first communications link, where in response the data is obtained from another processor (e.g., the coprocessor, the main processor, or a second coprocessor) and written to the memory circuit via a second communications link independent from the first communications link. The data bypasses both the initiating processor and the first communications link, which can improve both the performance of the initiating processor, and, the speed of the data transfer.

In step 701, a first processor (e.g., either the processing circuit or one of the coprocessors in FIGS. 3 and 4) sends a command and an access pattern to the memory controller via a first communications link. In step 702, the second processor sends a stream of data to the memory controller via a second communications link independent from the first communications link. The data bypasses both the first processor and the first communications link. In step 703, the memory controller decodes the access pattern to produce a series of addresses corresponding to locations in the memory circuit. In step 704, the memory controller sends a series of data write requests to the memory circuit, and writes the stream of data to the locations in the memory circuit corresponding to the series of addresses.

When the methods of FIGS. 6 and 7 are applied, synchronization between the first and second processors can be maintained in any of several ways. For example, when the first processor is the main processor and the second processor is a coprocessor, the direct link between the processing circuit and the coprocessor (e.g., FSL1, FSL2 in FIGS. 3 and 4) can be used to maintain synchronization, or an interrupt mechanism or busy loop can be implemented using a shared memory (not shown). These techniques are well known to those of skill in the art.

When the methods of FIGS. 6 and 7 are utilized, it may be desirable for the main processor to be the initiating processor and the coprocessor to receive the streaming data from, or write the streaming data to, the memory circuit, because main processors are typically not optimized for handling and computing streaming data. However, the present invention is not so limited. For example, an example of processes such as those shown in FIGS. 6 and 7 is described above in an exemplary embodiment in which the first and second processors are both coprocessors.

Those having skill in the relevant arts will now perceive various modifications and additions that can be made as a result of the disclosure herein. For example, the above text describes the circuits and methods of the invention in the context of programmable logic devices (PLDs). However, the circuits of the invention can also be implemented in other electronic systems, including non-programmable or partially programmable systems.

Accordingly, all such modifications and additions are deemed to be within the scope of the invention, which is to be limited only by the appended claims and their equivalents.

What is claimed is:

1. A system, comprising:
   a bus;
   a processor circuit coupled to the bus;
   a memory circuit;
   a multi-channel memory controller coupled between the bus and the memory circuit; and
   a first coprocessor coupled to the processor circuit, the first coprocessor further being coupled to the multi-channel memory controller via a first interface that bypasses the processor circuit and the bus,
   wherein the memory controller comprises an address generator circuit that calculates a series of sequential addresses for the memory circuit in response to data received from the coprocessor specifying a sequential access pattern, and that calculates a series of non-sequential addresses for the memory circuit in response to data received from the coprocessor specifying a non-sequential access pattern.

2. The system of claim 1, wherein:
   the system comprises an integrated circuit (IC) that includes the processor circuit, the memory circuit, the multi-channel memory controller, and the first coprocessor; and
   the bus comprises an on-chip peripheral bus of the IC.

3. The system of claim 1, wherein:
   the system comprises an integrated circuit (IC) that includes the memory circuit, the multi-channel memory controller, the first coprocessor, and the bus; and
   the processor circuit is implemented in a separate physical structure not included in the IC.

4. The system of claim 1, further comprising:
   a second coprocessor coupled to the processor circuit, the second coprocessor further being coupled to the multi-channel memory controller via a second interface that bypasses the processor circuit and the bus.

5. The system of claim 1, wherein:
   the first coprocessor is coupled to the processor circuit via a first serial interface; and
   the first coprocessor is coupled to the multi-channel memory controller via a second serial interface.

6. The system of claim 1, wherein the processor circuit comprises a microprocessor.

7. The system of claim 6, wherein the system comprises a programmable logic device (PLD), and the processor circuit comprises a microprocessor included as hard-coded logic in the PLD.

8. The system of claim 6, wherein the system comprises a programmable logic device (PLD), and the processor circuit comprises a microprocessor implemented using programmable logic elements of the PLD.

9. The system of claim 1, wherein the address generator circuit is coupled between the coprocessor and the multi-channel memory controller, the first interface traversing the address generator circuit.

10. The system of claim 1, wherein the address generator circuit calculates a series of linear addresses for the memory circuit in response to data received from the coprocessor specifying a linear access pattern and calculates a series of non-linear addresses for the memory circuit in response to data received from the coprocessor specifying a non-linear access pattern.

11. A method of operating a coprocessing system, wherein the system comprises a first processor circuit, a second processor circuit, a memory controller, and a memory circuit, the method comprising:
   sending a command and an access pattern from the first processor circuit to the memory controller via a first communications link;
   decoding the access pattern in the memory controller to produce a series of addresses corresponding to locations in the memory circuit;
   wherein the series of addresses produced comprises a series of sequential addresses in response to the access pattern received from the first processor circuit specifying a sequential access pattern, and the series of addresses produced comprises a series of non-sequential addresses in response to the access pattern received from the first processor circuit specifying a non-sequential access pattern;
   sending a series of read requests from the memory controller to the memory circuit and fetching in response a stream of data from the memory circuit at the locations corresponding to the series of addresses; and
   providing the stream of data from the memory controller to the second processor circuit via a second communications link independent from the first communications link, the stream of data bypassing the first processor circuit.

12. The method of claim 11, wherein the first processor circuit comprises a main processor, and the second processor circuit comprises a coprocessor.

13. The method of claim 11, wherein the first processor circuit comprises a first coprocessor, and the second processor circuit comprises a second coprocessor.

14. The method of claim 11, wherein the series of addresses produced comprises a series of linear addresses in response to the access pattern received from the first processor circuit specifying a linear access pattern, and the series of addresses produced comprises a series of non-linear addresses in response to the access pattern received from the first processor circuit specifying a non-linear access pattern.

15. A method of operating a coprocessing system, wherein the system comprises a first processor circuit, a second processor circuit, a memory controller, and a memory circuit, the method comprising:
   sending a command and an access pattern from the first processor circuit to the memory controller via a first communications link;
   sending a stream of data from the second processor circuit to the memory controller via a second communications link independent from the first communications link;
   decoding the access pattern in the memory controller to produce a series of addresses corresponding to locations in the memory circuit;
   wherein the series of addresses produced comprises a series of sequential addresses in response to the access pattern received from the first processor circuit specifying a sequential access pattern, and the series of addresses produced comprises a series of non-sequential addresses in response to the access pattern received from the first processor circuit specifying a non-sequential access pattern; and
   sending a series of data write requests from the memory controller to the memory circuit and writing the stream of data to the locations in the memory circuit corresponding to the series of addresses, the stream of data bypassing the first processor circuit.

16. The method of claim 15, wherein the first processor circuit comprises a main processor, and the second processor circuit comprises a coprocessor.

17. The method of claim 15, wherein the first processor circuit comprises a first coprocessor, and the second processor circuit comprises a second coprocessor.

18. The method of claim 15, wherein the series of addresses produced comprises a series of linear addresses in response to the access pattern received from the first processor circuit specifying a linear access pattern, and the series of addresses produced comprises a series of non-linear addresses in response to the access pattern received from the first processor circuit specifying a non-linear access pattern.

* * * * *